(12) United States Patent
Furuki

(10) Patent No.: US 6,268,671 B1
(45) Date of Patent: *Jul. 31, 2001

(54) VIBRATION GENERATION APPARATUS

(75) Inventor: Shigeru Furuki, Fukushima-ken (JP)

(73) Assignee: Alps Electric Co. Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,001

(22) Filed: Oct. 19, 1998

(30) Foreign Application Priority Data

Oct. 29, 1997 (JP) .................................... 9-297225

(51) Int. Cl.[7] .................................................. H02K 7/65
(52) U.S. Cl. ............................................. 310/81; 310/15
(58) Field of Search .................... 310/81, 130, 40 MM, 310/31, 12, 13, 15, 20; 318/114, 128, 130, 127, 129, 132, 116, 118, 119

(56) References Cited

U.S. PATENT DOCUMENTS

| | | | |
|---|---|---|---|
| 4,350,243 | * 9/1982 | Weyandt | 198/769 |
| 4,370,602 | * 1/1983 | Jones, Jr. et al. | 318/114 |
| 4,545,042 | * 10/1985 | Fomin et al. | 367/189 |
| 5,341,057 | * 8/1994 | Yamaguchi et al. | 310/81 |
| 5,373,207 | * 12/1994 | Yamaguchi et al. | 310/81 |
| 5,587,615 | * 12/1996 | Murray et al. | 310/30 |
| 5,668,423 | * 9/1997 | You et al. | 310/81 |
| 5,760,527 | * 6/1998 | Ashizawa | 310/317 |
| 5,903,076 | * 5/1999 | Suyama | 310/81 |

FOREIGN PATENT DOCUMENTS 248084A 2/1990 (JP).

* cited by examiner

Primary Examiner—Tran Nguyen
(74) Attorney, Agent, or Firm—Brinks Hofer Gilson & Lione (57) ABSTRACT

A vibration generation apparatus allows vibration frequency and amplitude to be independently controlled and to produce various modes of vibration involving shocks in addition to simple modes of vibration. The apparatus comprises a coil and a vibratory assembly comprising a-yoke providing a magnetic circuit, the coil being supplied with a drive current for a rectangular pulse of a constant peak value to cause the vibratory assembly to vibrate such that the amplitude of the vibration assembly corresponds to the duration of the rectangular-pulse drive current. The vibration generation apparatus allows the frequency and the duration of the rectangular-pulse drive current to be varied independently of each other.

18 Claims, 5 Drawing Sheets

VIBRATION GENERATION APPARATUS

BACKGROUND OF THE INVENTION

1. Field of the Invention

The present invention relates to a vibration generation apparatus for a game machine operation unit.

2. Description of the Related Art

Figure 10:
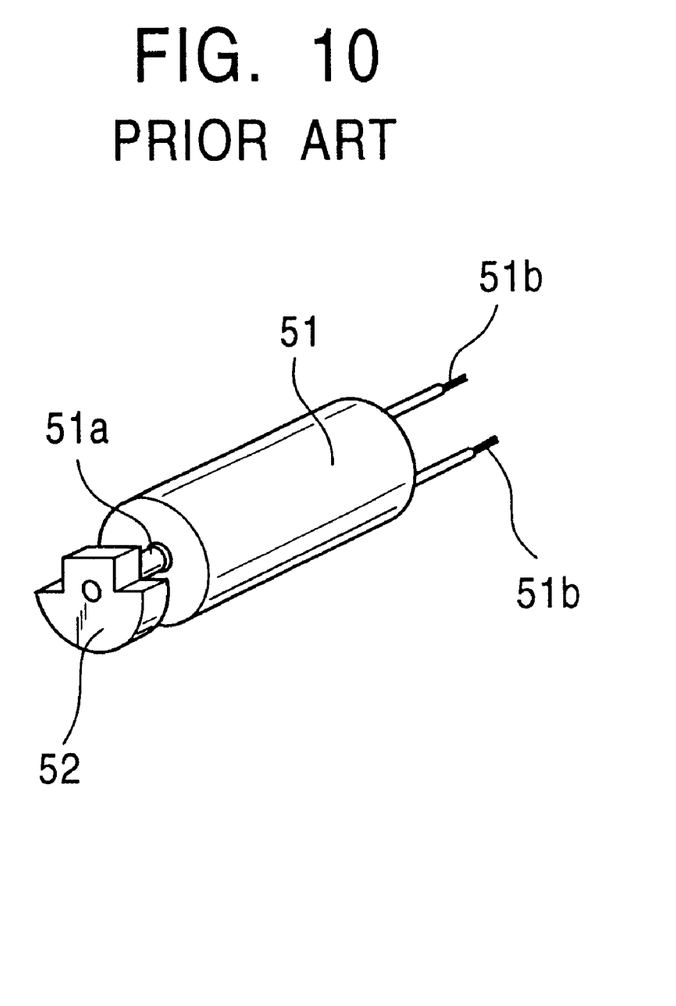
FIG. 10 is a perspective view of a conventional vibration generation apparatus.

Referring to FIG. 10, a conventional vibration apparatus is described below.

The conventional apparatus is made of a columnar direct-current (DC) motor 51 having an eccentric rotating mass 52, such as a weight in the form of a segment or a semicircular disc, on a rotation axis 51a thereof. In such a construction of the conventional vibration generation apparatus, DC voltage is provided from a power source (not shown) to power terminals 51b of the DC motor 51 so that vibration occurs.

When DC voltage is applied and the DC motor 51 rotates, the eccentric rotating mass 52, disposed on the rotation axis 51a, generates centrifugal force causing the entire DC motor 51 to vibrate.

In such a conventional vibration generation apparatus, however, when the speed of the DC motor rotation is increased, the centrifugal force caused by the eccentric rotating mass 52 is proportionally increased; the amplitude is thereby also increased so that frequency and amplitude cannot be controlled independently of each other. Because of this problem, game machine operations are limited in regard to the production of a variety of vibration modes to provide adequate simulation effects.

SUMMARY OF THE INVENTION

An object of the present invention is to provide a vibration generation apparatus that allows frequency and amplitude of vibration to be controlled independently of each other, and that generates, in addition to simple modes of vibration, other various modes of vibration involving shocks.

In order to do this, according to one aspect of the present invention, there is provided a vibration generation apparatus that comprises a vibratory assembly comprising a coil and a yoke, in which the yoke provides a magnetic circuit and rectangular-pulse drive current of a constant peak value is supplied to the coil to vibrate the vibratory assembly such that the amplitude of the vibration corresponds to the duration of the rectangular pulse. This allows the frequency of the rectangular-pulse drive current supplied by the driver and the duration of the rectangular pulse to be varied independently of each other. Therefore, the frequency and the amplitude of vibration of the vibratory assembly can be controlled independently of each other in order to provide various modes of vibration.

The vibration generation apparatus may further comprise a columnar plunger which cooperates with the yoke in providing the magnetic circuit and which is slidably received in the vibratory assembly, and an urging member comprising a protrusion formed on the yoke so as to oppose an end of the plunger and which is magnetized in a polarity opposite to that of the end of the plunger, whereby the plunger and the protrusion are urged away from each other. This allows the vibratory assembly to cause vibration simply by supplying it with the rectangular-pulse drive current.

The vibration generation apparatus may further comprise a stopper arranged to collide with the vibratory assembly when a predetermined amplitude of vibration of the vibratory assembly is exceeded, thereby controlling the vibration of the vibratory assembly so as not to exceed the predetermined amplitude, the vibratory assembly generating shocks upon collision with the stopper. Therefore, it is possible to produce, in addition to simple modes of vibration, various other modes of vibration involving shocks.

The stopper may comprise a first stopper constituted by the end of the plunger, and the rectangular-pulse drive current is arranged to flow to the coil for a period sufficient to cause the protrusion on the yoke to collide with the first stopper. Therefore, vibration involving shocks can be easily produced by simply prolonging the duration of the rectangular-pulse drive current.

The stopper may comprise a second stopper for limiting the movement of the vibratory assembly away from the first stopper, thereby allowing the vibratory assembly to generate shocks upon collision with the second stopper. Therefore, two shocks in one cycle of vibration are generated, allowing a grater variety of vibration modes to be provided.

The above and other objects, features and advantages of the present invention will become clear from the following description of the preferred embodiments.

DESCRIPTION OF THE PREFERRED EMBODIMENTS

Figure 1:
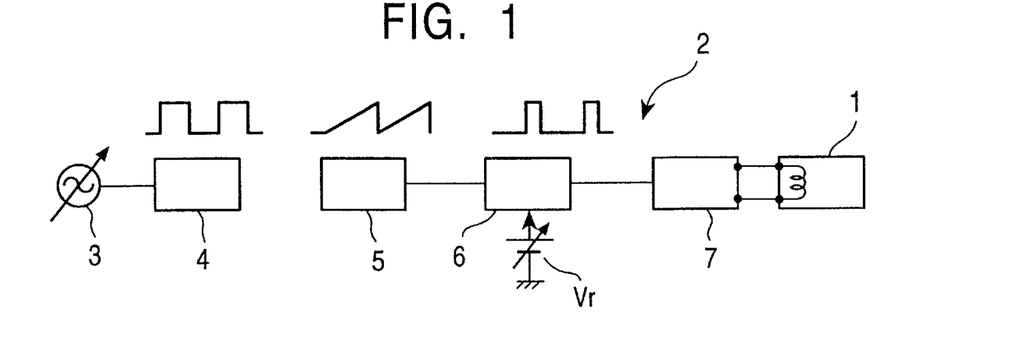
FIG. 1 is a schematic view showing a vibration generation apparatus of the present invention.

Referring to FIG. 1, the construction of a vibration generation apparatus of the present invention is described below.

The vibration generation apparatus of the present invention has a vibratory unit 1 and a drive current generating circuit 2 that supplies a drive current to the vibratory unit 1.

The drive current generating circuit 2 comprises a low-frequency vibrator 3, a pulse-shaping circuit 4, a serrated-pulse generating circuit 5, a duty control circuit 6, and a driving circuit 7.

The low-frequency vibrator 3 is capable of determining the frequency of vibration of the vibratory unit 1, and the frequency of vibration generated can be continuously controlled within a range from about 15 to several tens of hertz (Hz). The pulse-shaping circuit 4 is capable of shaping a sinusoidal vibrating signal from the low-frequency vibrator 3 into a rectangular pulse signal having a 50% duty ratio to input it to the serrated-pulse generating circuit 5. The serrated-pulse generating circuit 5 is capable of generating a serrated pulse which is gradually formed in a generation stage of a rectangular pulse signal from the pulse-shaping circuit.

The duty control circuit 6 is capable of generating the rectangular pulse signal based upon the serrated pulse input from the serrated-pulse generating circuit 5 and controlling the-duty ratio thereof. The duty control circuit 6 has a comparison circuit (not shown) having two input terminals; a serrated pulse is input from the serrated-pulse generating circuit 5 to one input terminal, and a reference voltage Vr is input to another input terminal.

In the comparison circuit, the serrated pulse is compared to the reference voltage Vr. If the voltage of the serrated pulse is determined to be higher than the reference voltage Vr, the comparison circuit produces an output of a high level. If the voltage of the serrated pulse is determined to be lower than the reference voltage Vr, the comparison circuit produces an output of a low level. In this way, an output from the comparison circuit is generated by the duty control circuit 6 as a rectangular pulse signal. This shows that in the present invention, changing the reference voltage Vr enables control of the duty ratio of a rectangular pulse signal from the duty control circuit 6.

Figure 2:
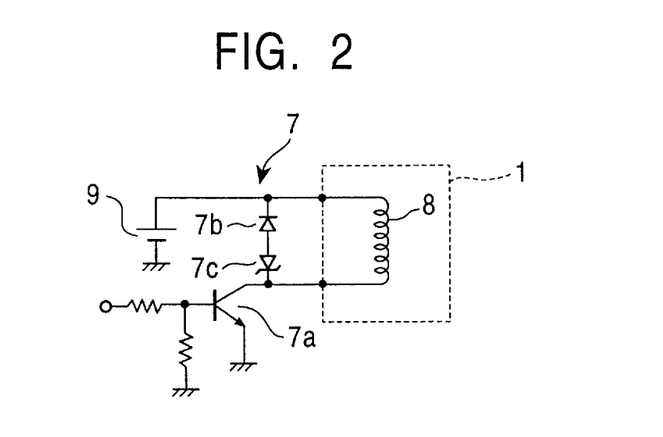
FIG. 2 is a view showing a driving circuit of the vibration generation apparatus of the present invention.

The driving circuit 7 has a power transistor 7a supplying the drive current to a coil 8 of the vibratory unit 1, as shown in FIG. 2. The coil 8 is connected between a power source 9 and a collector of the power transistor 7a. A rectangular pulse signal from the duty control circuit 6 is input therethrough to a base of the power transistor 7a. An emitter of the power transistor 7a is grounded.

In the aforementioned conditions, during a period of a high level (H) of the rectangular pulse signal, the power transistor 7a is turned on (the collector and the emitter are electrically communicated), allowing the drive current for a rectangular pulse to flow to the coil 8. However, during a period of a low level (L) of the rectangular pulse signal, the power transistor 7a is turned off (the collector and the emitter are electrically disconnected), not allowing a drive current for a rectangular pulse to flow to the coil 8. To prevent the power transistor 7a from possible damage by a strong counter electromotive force generated in the coil 8 when the power transistor 7a is turned off, a diode 7b and a Zener diode 7c are serially connected between the power source 9 and the collector.

Figure 3:
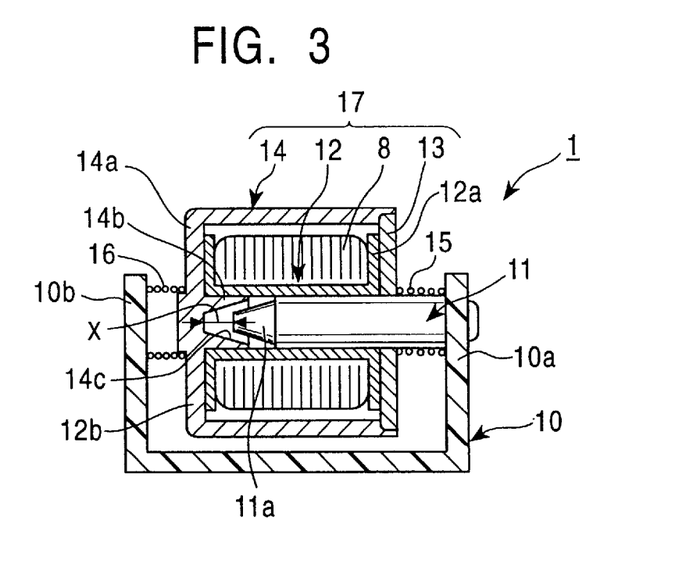
FIG. 3 is a main sectional view of a vibratory unit of the vibration generation apparatus of the present invention.

Hereinbelow, referring to FIG. 3, the construction of the vibratory unit 1 is described.

On a lateral wall 10a of a component member 10 made of synthetic resin, which is, for example, a U-shaped casing, a columnar plunger 11 made of a magnetic material is installed. A protruding end 11a of the columnar plunger 11 protrudes as a truncated cone. The columnar plunger 11 is installed to slidably receive a cylindrical coil bobbin 12 having the coil 8 thereon.

In a rim portion 12a of the coil bobbin 12, there is fixed a disc-like first yoke segment 13 made of a magnetic material, through which the columnar plunger 11 is slidably inserted. A second yoke segment 14 in a circular-cylinder form with a bottom is installed to generally surround the coil 8 on the coil bobbin 12. A bottom wall 14a of the second yoke segment 14 is fixed to another rim portion 12b of the coil bobbin 12. So as to generally cover the opening of the second yoke segment 14, the first yoke segment 13 and the second yoke segment 14 are coupled.

In a center portion of the bottom wall 14a of the second yoke segment 14, a protrusion 14b is formed coaxially to the columnar plunger 11 to oppose the protruding end 11a of the plunger 11. The protrusion 14b has a recessed portion 14c in the shape of a truncated cone to correspond to the truncated-cone shaped portion of the protruding end 11a of the columnar plunger 11. The recessed portion 14c is formed to accommodate the protruding end 11a of the columnar plunger 11.

Between the first yoke segment 13 and the lateral wall 10a of the component member 10, there is installed a first coil spring 15 as an urging member, in which the columnar plunger 11 is inserted. Between the lateral wall 10b of the component member 10 and the bottom wall 14a of the second yoke segment 14, a second coil spring 16 is installed as another urging member. The first coil spring 15 and the second coil spring 16 urge the first yoke segment 13 and the bottom wall 14a of the second yoke segment such that-they are pushed against each other.

As a result of the above, the protruding end 11a of the columnar plunger 11 and the protrusion 14b of the bottom wall 14a of the second yoke segment 14 are urged away from each other by a predetermined distance of X, i.e. a distance in the axial direction of the columnar plunger 11 between the protruding end 11a of the columnar plunger 11 and the recessed portion 14c (the truncated-cone shaped portion) of the protrusion 14b formed on the second yoke segment 14. This shows that the columnar plunger 11, the first yoke segment 13, and the second yoke segment 14 cooperate in providing a magnetic circuit.

In the vibratory unit 1 having such a construction as described above, when a drive current for a rectangular pulse flows to the coil 8, the protruding end 11a of the columnar plunger 11 and the protrusion 14b formed on the bottom wall 14a of the second yoke segment 14 have mutually different magnetic polarities (the N polarity or the S polarity) and pull each other against the urging force of the first coil spring 15. At this time, the first yoke segment 13, the second yoke segment 14, the coil bobbin 12, and the coil 8 are integrated to slide over the columnar plunger 11 toward the lateral wall 10a of the component member 10.

When a drive current for a rectangular pulse is discontinued to the coil 8, the first yoke segment 13, the second yoke segment 14, the coil bobbin 12, and the coil 8 are integrated to be urged by the urging force of the coil spring 15 to return to the original position. As a result, vibration is generated. In this way, the vibratory assembly 17 is configured by the first yoke segment 13, the second yoke segment 14, the coil bobbin 12, and the coil 8.

The vibratory unit 1 is installed in a housing of a game machine operation unit. For example, when an autoracing game is being played wherein a vehicle collides with an obstacle, the vibratory unit 1 generates various modes of vibration and transfers them to the housing. A sensation of such a collision can thereby be simulated for the game player.

Hereinbelow, referring to FIGS. 4 through 9, modes of vibration to be generated by the vibration generation apparatus of the present invention are described.

Figure 4:
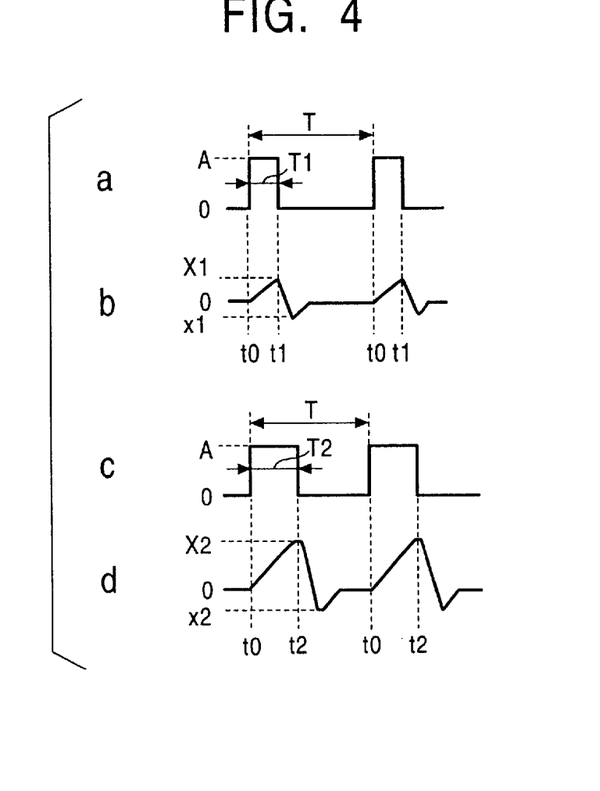
FIGS. 4A, 4B, 4C, and 4D are graphs showing the relationships between the drive current and driving modes of the vibration generation apparatus of the present invention.
Figure 5:
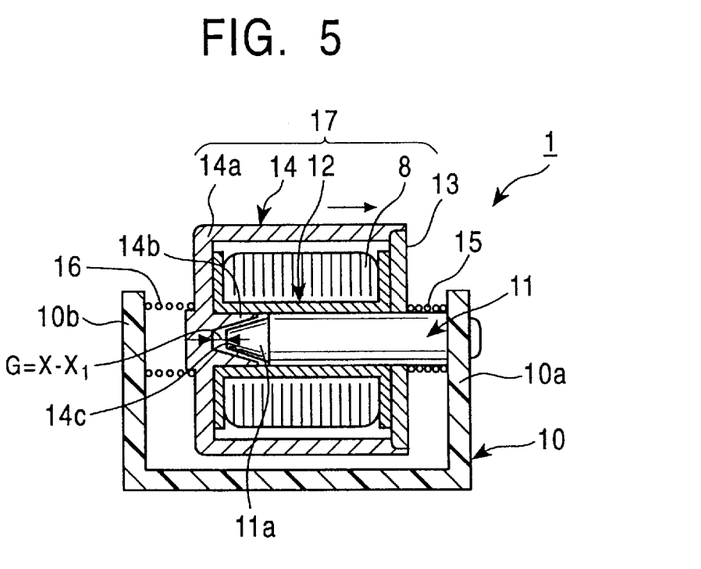
FIG. 5 is a view showing a vibration status of the vibratory unit of the vibration generation apparatus of the present invention.

FIGS. 4 and 5 are individual views illustrative of standard vibration modes without a shock included therein.

FIGS. 4A and 4B individually show a drive current for a rectangular pulse which flows to the coil 8 and a vibration status of the vibratory assembly 17 when respective amplitudes thereof are smaller.

Based on a rectangular pulse signal input to the driving circuit 7, the drive current for the rectangular pulse flows to the coil 8 in a period T1 with a repetition cycle T (repetition frequency: 1/T), wherein the duty ratio is (T1)/T. A peak value A of the drive current for the rectangular pulse which flows to the coil 8 in the period T1 is determined by the voltage of the power source 9 supplied to the power transistor 7 and the resistance of the coil 8.

Because of inertia, the vibratory assembly 17 of the vibratory unit 1 begins to move toward the lateral wall 10a of the component member 10 (in the direction of the arrow in FIG. 5) at a rise time t0 in the period T1. The vibratory assembly 17 terminates at a fall time t1 in the period T1. In the period T1, the movement distance is as indicated by X1 (refer to FIG. 4B).

The distance G (in FIG. 5) is the distance between the protruding end 11a of the columnar plunger 11 and the protrusion 14b formed on the second yoke segment 14, i.e. the distance in the axial direction of the plunger 11 between the protruding end 11a of the plunger 11 and the recessed portion 14c (in a truncated-cone shape) of the protrusion 14b formed on the second yoke segment 14. The distance G is expressed as G=X−X1, as shown in FIG. 5; therefore, the two never collide with each other.

When the drive current for the rectangular pulse is discontinued at the time t1, the vibratory assembly 17 is forced by the urging force of the first coil spring 15 to return to an original position 0. At this time, because of inertia, the assembly 17 passes over the original position 0 and continues to move up to a position x1. The vibratory assembly 17 still continues to move and passes over the original position 0 several times until its motion is damped down. However, when the drive current for a rectangular pulse resumes its flow, the vibratory assembly 17 moves by a distance X1; thereby the columnar plunger 11 continues axial reciprocative vibration with the amplitude expressed as X+x1.

In order to further increase the amplitude of the vibratory assembly 17, as shown in FIG. 4C, the lengthening of a period T2 in which a drive current for a rectangular pulse flows enables the movement distance X2 to be longer than X1, as shown in FIG. 4D. At this time as well, the movement distance x2 of the vibratory assembly 17 at the time of return becomes longer than x1, so that the entire amplitude may be expressed as X2+x2. The period T2 is set in a range wherein the movement of the vibratory assembly 17 does not cause the protruding end 11a of the columnar plunger 11 and the protrusion 14b of the second yoke segment 14 to collide with each other.

In order to change the period of the drive current for a rectangular pulse which flows to the coil 8 in the aforementioned range, changing the level of the reference voltage Vr to be supplied to the duty control circuit 6 of the drive current generating circuit 2 changes the duty ratio of a rectangular pulse signal from the duty control circuit 6 as well as the duty ratio of the drive current for a rectangular pulse from the driving circuit 7; thereby the amplitude is allowed to be widely varied. Also, changing the generating-vibration frequency of the low-frequency vibrator 3 of the drive current generating circuit 2 changes the frequency of a rectangular pulse signal from the duty control circuit 6 as well as the frequency of the drive current for a rectangular pulse from the driving circuit 7; the vibration frequency of the vibratory unit 1 is thereby allowed to be widely varied, independent of the amplitude of vibration.

In this way, changing the repetition frequency and the duty ratio of the drive current for a rectangular pulse independently enables the frequency and the amplitude of vibration generated by the vibratory unit 1 to be independently controlled, allowing various modes of vibration to be provided.

Hereinbelow, referring to FIGS. 6 and 7, vibration modes including shocks are described.

As shown in FIG. 6A, a drive current for a rectangular pulse flows to the coil 8 in a period T3 with the repetition cycle T (repetition frequency: 1/T), wherein the duty ratio is (T3)/T, based on a rectangular pulse signal input to the driving circuit 7. A peak value A of the drive current for the rectangular pulse which flows to the coil 8 in the period T3 is determined by the voltage of the power source 9 supplied to the power transistor 7 and the resistance of the coil 8.

Figure 6:
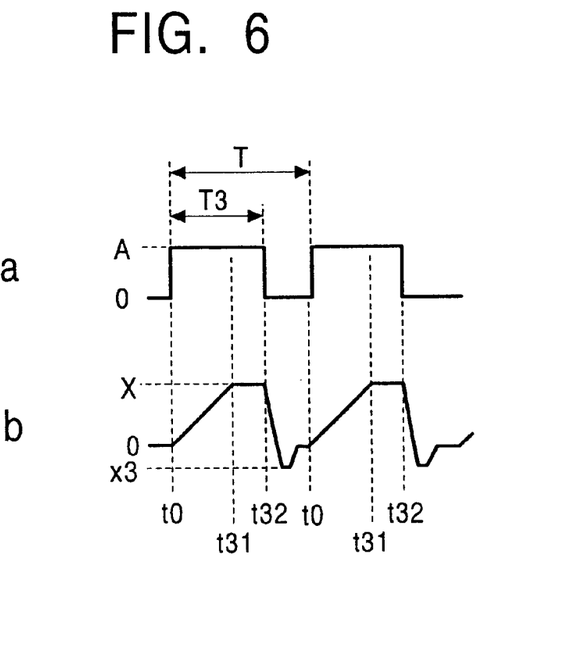
FIGS. 6A and 6B are graphs showing the relationships between the drive current and driving modes of the vibration generation apparatus of the present invention.
Figure 7:
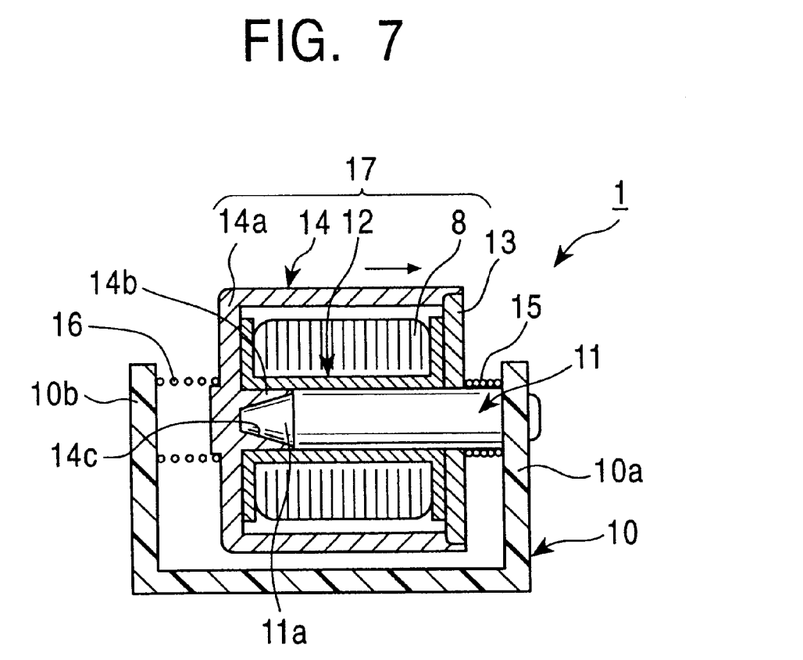
FIG. 7 is a view showing a vibration status of the vibratory unit of the vibration generation apparatus of the present invention.

Because of inertia, the vibratory assembly 17 of the vibratory unit 1 begins to move in the direction of the arrow in FIG. 7 at a rise time t0 in the period T3 and it terminates at a fall time t31 in a state (in the state of FIG. 7) wherein the protrusion 14b of the second yoke segment 14 slidably collides with the protruding end 11a of the columnar plunger 11. In the period T3, the movement distance is as indicated by X (refer to FIG. 6B). The aforementioned colliding action causes a shock. The period T3 is set to continue up to beyond the fall time t31 wherein the protruding end 11a of the columnar plunger 11 and the protrusion 14b of the second yoke segment 14 collide with each other.

The drive current for the rectangular pulse continues up to a fall time t32 in the period T3; however, the distance X of movement of the vibratory assembly 17 is controlled as it is. This allows the protruding end 11a of the plunger 11 to have the role of a first stopper to control the amplitude of vibration of the vibratory assembly When the drive current for the rectangular pulse is discontinued at the time t32, the vibratory assembly 17 is forced by the urging force of the first coil spring 15 to return to the original position 0. Because of inertia, however, the vibratory assembly 17 passes over the original position 0 and continues to move up to the position x3. The vibratory assembly 17 continues to move and passes over the original position 0 for several times until its motion is damped down. However, when the drive current for a rectangular pulse resumes its flow, the vibratory assembly 17 moves by a distance X and the vibration continues. At this time, the amplitude is expressed as X+x3. This shows that the amplitude is therein further increased compared to those shown in FIGS. 4 and 5.

In this state, the protrusion 14b of the second yoke segment 14 and the protruding end 11a of the columnar plunger 11 collide with each other, generating a shock. This allows the generation of a different mode of vibration from those as shown in FIGS. 4 and 5.

The vibratory unit 1, as shown in FIGS. 6 and 7, generates a mode of vibration involving one shock in one cycle of vibration by the vibratory assembly 17. However, a vibratory unit 21, as shown FIGS. 8 and 9, allows the generation of vibration involving two shocks in one cycle of vibration.

Figure 8:
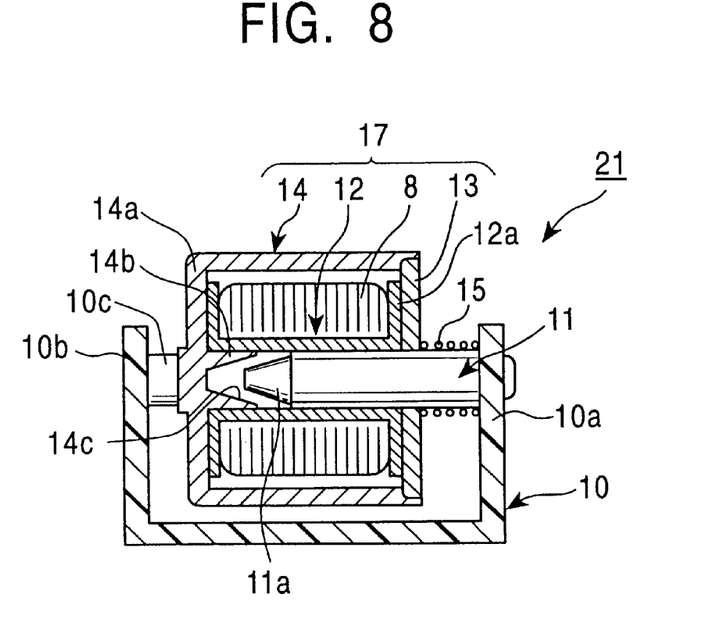
FIG. 8 is a view showing a vibration status of the vibratory unit of the vibration generation apparatus of the present invention.

The vibratory unit 21 is a construction having a protrusion 10c as a second stopper formed on a lateral wall 10b of a component member 10, coaxially to a columnar plunger 11. Unlike the apparatus 1, the apparatus 21 does not have a second coil spring 16. In a condition wherein a drive current for a rectangular pulse is discontinued to a coil 8, a bottom wall 14a of a second yoke segment 14 of a vibratory assembly 17 is urged by a (first) coil spring 15 to collide with the protrusion 10c, as shown in FIG. 8.

Figure 9:
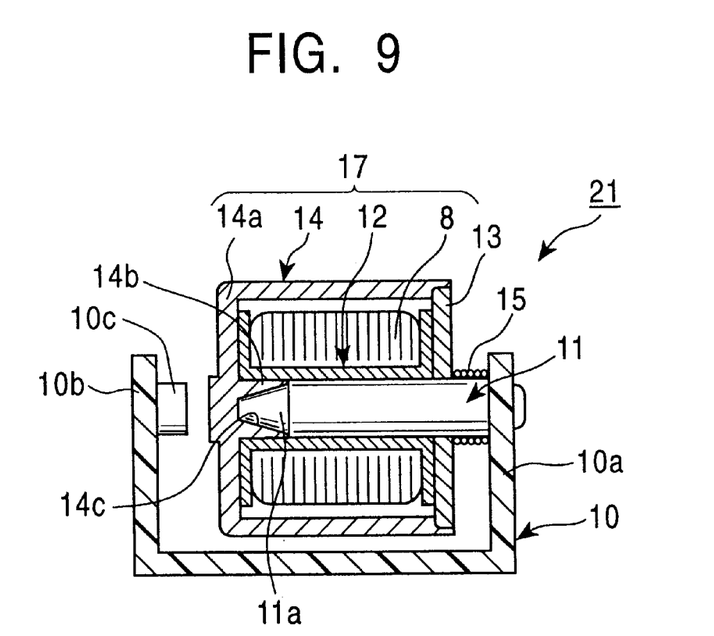
FIG. 9 is a view showing a vibration status of another vibratory unit of the vibration generation apparatus of the present invention.

In such a mechanism, when a drive current for a rectangular pulse is allowed to flow to the coil 8, a continuation period of the drive current is arranged so that a sufficient distance is provided between the protrusion 14b of the second yoke segment 14 and the protruding end 11a of the columnar plunger 11 which collide with each other. As a result of this arrangement, when the drive current for a rectangular pulse is allowed to flow, the protrusion 14b of the second yoke segment 14 and the protruding end 11a of the columnar plunger 11 collide with each other, and the protrusion 10c of the component member 10 and the bottom wall 14a of the second yoke segment 14 are urged away from each other, as shown in FIG. 9.

In the aforementioned arrangement, however, when the drive current for a rectangular pulse is discontinued, the vibratory assembly 17 is urged by the (first) coil spring 15 to return to the original position and the bottom wall 14a of the second yoke segment 14 collides with the protrusion 10c of the component member 10. In this way, two shocks are involved in vibration; one is involved when the drive current for a rectangular pulse is allowed to flow and the vibratory assembly 17 moves to a lateral wall 11a of the component member 10, and another is involved when the drive current for a rectangular pulse is discontinued and the vibratory assembly 17 returns toward the lateral wall 10b.

What is claimed is:

1. A vibration generation apparatus comprising:
   a vibratory assembly comprising a coil and a yoke, the yoke providing a magnetic circuit, wherein the vibratory assembly is configured to vibrate in at least one mode of vibration and the at least one mode of vibration includes generating at least one shock;
   a driving mechanism supplying the coil with rectangular-pulse drive current of a constant peak value to vibrate the vibratory assembly such that the amplitude of the vibration corresponds to the duration of the rectangular pulse;
   a control mechanism varying the frequency of the rectangular pulse-drive current supplied by the driving means and the duration of the rectangular pulse independently of each other;
   a columnar plunger which cooperates with the yoke in providing the magnetic circuit and which is slidably received in the vibratory assembly; and
   urging means comprising a protrusion formed on the yoke so as to oppose an end of the plunger and magnetized in a polarity opposite to that of the end of the plunger, whereby the plunger and the protrusion are urged away from each other.

2. A vibration generation apparatus according to claim 1, further comprising a stopper means arranged to collide with the vibratory assembly when a predetermined amplitude of vibration of the vibratory assembly is exceeded, thereby controlling the vibration of the vibratory assembly so as not to exceed a predetermined amplitude, the vibratory assembly generating the at least one shock upon collision with the stopper means.

3. A vibration generation apparatus according to claim 2, wherein the stopper means comprises a first stopper constituted by the end of the plunger, and wherein the driving means supplies the rectangular-pulse drive current for a period sufficient to cause the protrusion on the yoke to collide with said first stopper, the vibratory assembly generating a first shock upon collision of the protrusion with the first stopper.

4. A vibration generation apparatus according to claim 3, wherein the stopper means comprises a second stopper for limiting the movement of the vibratory assembly away from the first stopper, the vibratory assembly generating a second shock upon collision with said second stopper.

5. A vibration generation apparatus according to claim 2, wherein the stopper means comprises a second stopper for limiting the movement of the vibratory assembly away from a first stopper, the vibratory assembly generating a second shock upon collision with said second stopper.

6. A vibration generation apparatus comprising:
   a vibratory assembly comprising a coil and a yoke, the yoke providing a magnetic circuit, wherein the vibratory assembly is configured to vibrate in at least one mode of vibration and the at least one mode of vibration includes generating at least one shock;
   a driving mechanism supplying the coil with rectangular-pulse drive current of a constant peak value to vibrate the vibratory assembly such that the amplitude of the vibration corresponds to the duration of the rectangular pulse; and
   a control mechanism varying the frequency of the rectangular pulse-drive current supplied by the driving means and the duration of the rectangular pulse independently of each other;
   a stopper means arranged to collide with the vibratory assembly when a predetermined amplitude of vibration of the vibratory assembly is exceeded, thereby controlling the vibration of the vibratory assembly so as not to exceed a predetermined amplitude, the vibratory assembly generating the at least one shock upon collision with the stopper means.

7. A vibration generation apparatus according to claim 6, wherein the stopper means comprises a first stopper constituted by the end of a plunger, and wherein the driving means supplies the rectangular-pulse drive current for a period sufficient to cause a protrusion on the yoke to collide with said first stopper, the vibratory assembly generating a first shock upon collision of the protrusion with the first stopper.

8. A vibration generation apparatus according to claim 7, wherein the stopper means comprises a second stopper for limiting the movement of the vibratory assembly away from the first stopper, the vibratory assembly generating a second shock collision with said second stopper.

9. A vibration generation apparatus according to claim 6, wherein the stopper means comprises a second stopper for limiting the movement of the vibratory assembly away from a first stopper, the vibratory assembly generating the at least one shock upon collision with said second stopper.

10. A vibration generation apparatus comprising:
    a vibratory assembly comprising a coil and a yoke, the yoke providing a magnetic circuit;
    a driving mechanism supplying the coil with rectangular-pulse drive current of a constant peak value to vibrate the vibratory assembly such that the amplitude of the vibration corresponds to the duration of the rectangular pulse;
    a control mechanism varying the frequency of the rectangular pulse-drive current supplied by the driving means and the duration of the rectangular pulse independently of each other;
    a columnar plunger which cooperates with the yoke in providing the magnetic circuit and which is slidably received in the vibratory assembly; and
    urging means comprising a protrusion formed on the yoke in opposition to an end of the plunger and magnetized in a polarity opposite to that of the end of the plunger, whereby the plunger and the protrusion are urged away from each other.

11. A vibration generation apparatus according to claim 10, further comprising stopper means arranged to collide with the vibratory assembly when a predetermined amplitude of vibration of the vibratory assembly is exceeded, thereby controlling the vibration of the vibratory assembly so as not to exceed a predetermined amplitude, the vibratory assembly generating shocks upon collision with the stopper means.

12. A vibration generation apparatus according to claim 11, wherein the stopper means comprises a first stopper constituted by the end of the plunger, and wherein the driving mechanism supplies the rectangular-pulse drive current for a period sufficient to cause the protrusion on the yoke to collide with said first stopper.

13. A vibration generation apparatus according to claim 12, wherein the stopper means comprises a second stopper for limiting the movement of the vibratory assembly away from the first stopper, the vibratory assembly generating shocks upon collision with said second stopper.

14. A vibration generation apparatus according to claim 11, wherein the stopper means comprises a second stopper for limiting the movement of the vibratory assembly away from a first stopper, the vibratory assembly generating shocks upon collision with said second stopper.

15. A vibration generation apparatus comprising:
   a vibratory assembly comprising a coil and a yoke, the yoke providing a magnetic circuit;
   a driving mechanism supplying the coil with rectangular-pulse drive current of a constant peak value to vibrate the vibratory assembly such that the amplitude of the vibration corresponds to the duration of the rectangular pulse;
   a control mechanism varying the frequency of the rectangular pulse-drive current supplied by the driving means and the duration of the rectangular pulse independently of each other; and
   stopper means arranged to collide with the vibratory assembly when a predetermined amplitude of vibration of the vibratory assembly is exceeded, thereby controlling the vibration of the vibratory assembly so as not to exceed a predetermined amplitude, the vibratory assembly generating shocks upon collision with the stopper means.

16. A vibration generation apparatus according to claim 15, wherein the stopper means comprises a first stopper constituted by the end of a plunger, and wherein the driving mechanism supplies the rectangular-pulse drive current for a period sufficient to cause a protrusion on the yoke to collide with said first stopper.

17. A vibration generation apparatus according to claim 16, wherein the stopper means comprises a second stopper for limiting the movement of the vibratory assembly away from the first stopper, the vibratory assembly generating shocks upon collision with said second stopper.

18. A vibration generation apparatus according to claim 15, wherein the stopper means comprises a second stopper for limiting the movement of the vibratory assembly away from a first stopper, the vibratory assembly generating shocks upon collision with said second stopper.

* * * * *

UNITED STATES PATENT AND TRADEMARK OFFICE
CERTIFICATE OF CORRECTION

| | |
|---|---|
| PATENT NO. | : 6,268,671 B1 |
| DATED | : July 31, 2001 |
| INVENTOR(S) | : Shigeru Furuki |

Page 1 of 1

It is certified that error appears in the above-identified patent and that said Letters Patent is hereby corrected as shown below:

<u>Title page,</u>
ABSTRACT, line 5, delete "-" (hyphen) before "yoke".

Signed and Sealed this

Twelfth Day of March, 2002

Attest:

Attesting Officer

JAMES E. ROGAN
*Director of the United States Patent and Trademark Office*